United States Patent Office 2,699,419
Patented Jan. 11, 1955

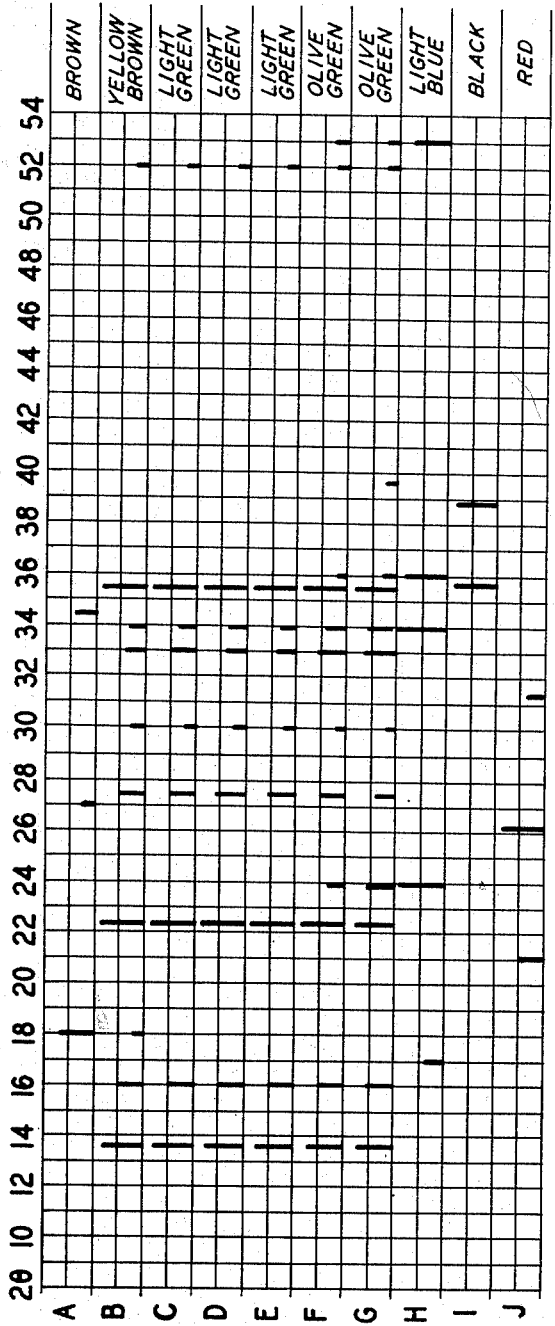

2,699,419

PESTICIDAL COPPER CHROMATES AND METHOD OF MAKING AND APPLYING SAME

Fred R. Whaley, Kenmore, Carleton N. Smith, Snyder, and Richard H. Wellman, Hastings on Hudson, N. Y., assignors to Union Carbide and Carbon Corporation, a corporation of New York Application October 25, 1951, Serial No. 253,065

7 Claims. (Cl. 167—16)

This invention relates to pesticidal materials containing copper and chromium and to pesticidal compositions containing such materials, and to methods of preparing such materials and compositions and of combatting pests by means of such materials and compositions. The present application is a continuation in part of the copending application Serial No. 633,530, filed December 7, 1945, now Patent No. 2,573,738, dated November 6, 1951. The subject matter of the present application represents research conducted and findings made with respect to compounds of copper and chromium, the discovery being that over a limited range of proportions of these metals and with compounds having a certain X-ray pattern there are better disease control and higher yields of agricultural products than with the same metals in other proportions and in compounds having other X-ray patterns, particularly with respect to potato blights and yields of potatoes under high blight potential.

On the accompanying drawing are reproduced X-ray patterns of the materials to which the present invention relates and of comparative materials.

The copper chromates of the present invention have a copper to chromium molar ratio of $XCu(OH)_2$ to $1CrO_3$, X being greater than 3 and ranging upwards to include 6, these chromates being distinguished by strong lines on X-ray patterns (CuK$\alpha$ radiation) at values of $2\theta$ equal to 13.6, 22.3, and 35.5 and weaker lines at 16, 26.4, and 33, as shown on the accompanying drawing. As will be seen from the drawing, these lines are entirely absent from a chromate where X is 3 or a copper compound where $CrO_3$ is zero. Where X is 5.5, two of the distinctive lines of cupric hydroxide at 23.9 and 36 appear faintly and show more strongly where X is 6. The preferred chromates are those where X is from greater than 3 up to and including 5, the optimum for X being between 4 and 5. All of these chromates are basic and all have colors containing a portion of yellow, that is the colors range from a yellow brown to an olive green, the chromates where X is from 4 to 5 inclusive being a light green scarcely noticeable on potato foliage or on the green parts of other plants. Where X is below 5.5 the X-ray patterns indicate the absence of unreacted copper hydroxide. The pattern (CuK$\alpha$ radiation) for CuO contains two strong lines at 35.6 and 38.8 of almost equal intensity and the three principal lines for $CrO_3$ are at 26.2, 21.1, and 31.3.

In a comparative field test, plots of Russet and Katahdin potato plants were given regular sprayings of Bordeaux (8–8–100) mixture, a copper chromate designated A, and a copper chromate designated D. The composition of the Bordeaux spray was 8 pounds of $CuSO_4 \cdot 5H_2O$ and 8 pounds of CaO per 100 gallons of water. The copper chromate A analyzed 3Cu to 1Cr (indicating a formula which may be written $3Cu(OH)_2 \cdot 1CrO_3$) and had the X-ray pattern shown on line A of the attached drawing. The analysis of copper chromate D indicated the formula $4.5CuO \cdot 1CrO_3$. It had the X-ray pattern shown on line D of the attached drawing. Both chromates were used at the rate of 2 pounds per 100 gallons of water. All sprays contained 2 pounds of 50% wettable DDT powder per 100 gallons. The sprayings were at the rates of about 125 gallons per acre and were made at intervals of 7 to 14 days beginning when the plants were about 6 inches high. Each test plot received only one type of spray and check plots received the DDT spray but no fungicidal spray. At the end of the season of blight damage, estimates were made of the amount of combined early and late blight damage; at the end of the growing season the plants showed no damage due to phytotoxicity and the potatoes were harvested and weighed. The tests were run on four randomly selected replicate plots for each fungicide tested. The check plot was an integral part of the test, and also replicated four times.

The data obtained from these tests are given in the following Table I.

Table I

| Treatment | Russets | | Katahdins | |
|---|---|---|---|---|
| | Disease Control | Yield Bu./Acre | Disease Control | Yield Bu./Acre |
| Check | 0 | 331 | 0 | 356 |
| Bordeaux | 104 | 373 | 102 | 387 |
| A (2 lb./100 gal.) | 93 | 395 | 92 | 362 |
| D (2 lb./100 gal.) | 102 | 413 | 106 | 406 |

In the above table, the figures given in the columns headed "Disease Control" are an index obtained by the formula:

$$\text{Index} = \frac{(\text{Actual disease control rating for a given treatment})}{(\text{Average of all three treatments involved in the test*})} \times 100$$

*Note.—The checks or untreated plots were not used in making the average.

In the above formula the actual ratings are the sum of the individual ratings by six trained observers. Each observer gave a plot a value from 0 (everything dead of disease) to 20 (perfect), the ratings being for general appearance and reflecting primarily disease control but also any depressing effect the treatment had on the vigor of the plants, hastening of maturity, etc. The sum of these six ratings is used as the disease control figure and therefore 120 would be a perfect record in this respect. Both early blight and late blight attack were considered in making these ratings, i. e. the effects of these diseases together but not rated separately.

The figures given in the columns headed "Yield" are the comparative weights of potatoes yielded by the test plots and corrected for stand expressed in bushels per acre at the conversion value of 100 bushels per acre equals $$\frac{100}{1.452}$$

pounds per plot (1 bushel=60 pounds).

The actual disease control total ratings are given in Table II.

Table II

| Fungicide | Russets | Katahdins |
|---|---|---|
| none (check) | 0 | 0 |
| Bordeaux | 106.5 | 90.0 |
| A | 95 | 81.5 |
| D | 104.5 | 93 |

The data obtained from the tests may also be given as yield and control indexes as in the following Table III.

Table III

| Treatment | Yield Index | | Average Yield Index | Average Disease Control Index |
|---|---|---|---|---|
| | Russets | Katahdins | | |
| Check | 84 | 92 | 88 | 0 |
| Bordeaux | 95 | 101 | 98 | 102 |
| A (2 lb./100 gal.) | 100 | 94 | 97 | 93 |
| D (2 lb./100 gal.) | 105 | 106 | 105 | 104 |

In the above table, the figures given in the column headed "Russets" were obtained by the formula:

$$\frac{\text{Actual yield for given treatment}}{\text{Average of all yields on treated plots}} \times 100$$

The figures given in the column headed "Katahdins" were obtained in a similar manner. The "Average Disease Control Index" is the average of the "Disease Control" figures from Table I.

From the foregoing tables it will be seen that compound D is better than compound A in disease control and that better yields are obtained when compound D is used than when either Bordeaux or compound A is used.

In a series of tests to determine the fungicidal effect of another chromate on early and late blight of tomato plants, potted plants from about 6 to 8 inches in height were sprayed until thoroughly wet with homogeneous aqueous suspensions containing either 0.2% or 0.04% by weight of a chromate whose analysis indicated the formula $4.85CuO \cdot 1CrO_3$. It had the X-ray pattern shown on line D of the attached drawing. The plants were allowed to dry after spraying; and after drying the sprayed plants together with unsprayed check plants were inoculated with spores of either early blight or late blight. All plants were then transferred to a greenhouse and from three to five days after such transfer the number of blight lesions were counted on the respective plants. Considering the number of lesions on the unsprayed check plants as 100%, the early blight lesions were only 8% of the lesions on the check plants for the plants sprayed with the 0.2% suspension and only 12% for the plants sprayed with the 0.04% suspension. The lesions of late blights on the plants sprayed with the 0.2% suspension were only 2% and on the plants sprayed with the 0.04% suspension were only 5% of the late blight lesions on the unsprayed check plants.

In other tests to determine phytotoxicity, a homogeneous aqueous suspension containing 1% by weight of the aforesaid $4.85CuO \cdot 1CrO_3$ chromate was sprayed on potted bean and tomato plants about 6 to 8 inches high until the plants were thoroughly wet. The plants were then transferred to a greenhouse. Observations made about a week after spraying gave the tomato plants an A rating (no injury) and the bean plants an A— rating (very slight and barely noticeable injury).

The chromates contemplated herein give good fungi control when applied at rates from 1 to 3 pounds per acre, no phytotoxicity having been shown at these rates. Economically, the materials are preferably applied at rates from 1.25 to 2.50 pounds per acre. To facilitate the application of this small amount of material, it is preferably applied in homogeneous combination with a carrier or extender. Any amount and type of extender may be used and the selection depends primarily upon the type of applicator used. Many agriculturists prefer to spray aqueous suspensions at rates up to about 150 gallons per acre usually at the rate of about 125 gallons per acre. Newer spray devices apply aqueous sprays at rates of about 20 gallons per acre or less and from these small gallonages on up to the usual amounts. The inert or extender may be any of the usual dry materials, for instance powdered talc, infusorial earth, pyrophyllite, celite and the like, for agriculturists equipped to apply dry fungicides. Dry fungicides are frequently applied at rates of from about 25 to 75 pounds per acre, usually at about 50 pounds per acre, including extender. A dust containing 2% to 6% by weight of active material, applied at 50 pounds per acre gives an application of from 1 to 3 pounds of active material per acre but the preferred dust applies from about 1.25 to 2.50 pounds of active material per acre. The extenders may contain any other material if desired, for instance the usual insecticides as DDT, lead arsenate, and the like as described in said application Serial No. 633,530.

In making a compound of the formula $$4.5CuO \cdot CrO_3 \cdot 5H_2O$$

75.3 gram moles of powdered $Cu(OH)_2$ were stirred into 15.4 gallons of water until a homogeneous slurry was formed. To the slurry were added 16.67 gram moles of $CrO_3$, with stirring, over the space of one-half hour. Agitation was continued for an additional three hours after which the precipitate was filtered off. All mixing and precipitation was done at room temperature (about 21° C.) and tap water was used to prepare the slurry. The precipitate was not washed and after removal from the filter was dried at 88° C. to constant weight. The dried material was pulverized to a fineness of less than 0.1% retained on 325 mesh (wet screening). The yield was 16.67 gram moles. When prepared in this way, that is by adding the $CrO_3$ slowly to the $Cu(OH)_2$ and agitating or otherwise working the mass while the color changes are occurring and until well after there is no further color change, that is agitating until the light green color is obtained throughout the mass and further working, say for one-half hour or more, does not affect the color, the product has the distinctive X-ray pattern shown on line D of the drawing. The $CrO_3$ is preferably used in the solid form as flakes or powder but it may be used in aqueous solution which, however, is preferably highly concentrated. Cupric hydroxide is the reactant preferred over the corresponding oxide or salts. The oxide is not as reactive as the hydroxide in this reaction and tends to give a product with a lower amount of combined copper and more free copper oxide while the salts introduce contaminants.

Of the chromates contemplated herein, those having a greenish cast are preferred as they are less noticeable on the plants than Bordeaux and they are less noticeable than the brown or yellow-brown chromates A and B even though they contain more copper. Where there is even a remote chance of copper injury, it is preferred to use a chromate whose X-ray pattern gives no indication of the presence of copper hydroxide. Thus, with the chromates contemplated herein, it is possible to combine the fungicidal effect of chromium with the high fungicidal effect of a high proportion of copper, and yet run little or no risk of copper effect in stunting plants and reducing yields.

What is claimed is:

1. A pesticide comprising a basic chromate containing copper and having a copper to chromium ratio of from greater than 3 to about 6 moles of copper to 1 mole of hexavalent chromium and having an X-ray pattern showing strong lines at values of $2\theta$ of 13.6, 22.3, and 35.5 under copper $K\alpha$ radiation, the chromate being substantially free from copper hydroxide and such as is prepared by incorporating $CrO_3$ into $Cu(OH)_2$ and reacting the $CrO_3$ with the $Cu(OH)_2$ in the said copper to chromium molar ratios, the color of the chromate varying from a yellow brown to a light green to an olive green as the amount of copper reacted with the chromium increases within said limits.

2. A pesticide comprising a basic chromate containing copper and having a copper to chromium ratio of from about 4 to about 5 moles of copper to 1 mole of hexavalent chromium and having an X-ray pattern showing strong lines at values of $2\theta$ of 13.6, 22.3, and 35.5 under copper $K\alpha$ radiation, the chromate being substantially free from copper hydroxide and such as is prepared by incorporating $CrO_3$ into $Cu(OH)_2$ and reacting the $CrO_3$ with the $Cu(OH)_2$ in the said copper to chromium molar ratios, the color of the chromate varying from a yellow brown to a light green to an olive green as the amount of copper reacted with the chromium increases within said limits.

3. A pesticide comprising a basic chromate containing copper and having a copper to chromium ratio of from greater than 3 to about 6 moles of copper to 1 mole of hexavalent chromium and having an X-ray pattern showing strong lines at values of $2\theta$ of 13.6, 22.3, and 35.5 under copper $K\alpha$ radiation, together with an admixed carrier, the chromate being substantially free from copper hydroxide and such as is prepared by incorporating $CrO_3$ into $Cu(OH)_2$ and reacting the $CrO_3$ with the $Cu(OH)_2$ in the said copper to chromium molar ratios, the color of the chromate varying from a yellow brown to a light green to an olive green as the amount of copper reacted with the chromium increases within said limits.

4. Method of protecting an organic material subject to attack by pests which comprises applying to said material a basic chromate containing copper and having a copper to chromium ratio of from greater than 3 to about 6 moles of copper to 1 mole of hexavalent chromium and having an X-ray pattern showing strong lines at values of $2\theta$ of 13.6, 22.3, and 35.5 under copper $K\alpha$ radiation, the chromate being substantially free from copper hydroxide and such as is prepared by incorporating $CrO_3$ into $Cu(OH)_2$ and reacting the $CrO_3$ with the $Cu(OH)_2$ in the said copper to chromium molar ratios, the color of the chromate varying from a yellow brown to a light green to an olive green as the amount of copper reacted with the chromium increases within said limits.

5. Method of protecting plants against attack by pests which comprises applying to the plants a basic chromate containing copper and having a copper to chromium ratio of from greater than 3 to about 6 moles of copper to 1 mole of hexavalent chromium and having an X-ray pattern showing strong lines at values of $2\theta$ of 13.6, 22.3, and 35.5 under copper $K\alpha$ radiation, the chromate being substantially free from copper hydroxide and such as is prepared by incorporating $CrO_3$ into $Cu(OH)_2$ and reacting the $CrO_3$ with the $Cu(OH)_2$ in the said copper to chromium molar ratios, the color of the chromate varying from a yellow brown to a light green to an olive green as the amount of copper reacted with the chromium increases within said limits.

6. Method of protecting field crop plants against attack by pests which comprises applying to the plants a basic chromate containing copper and having a copper to chromium ratio of from greater than 3 to about 6 moles of copper to 1 mole of hexavalent chromium and having an X-ray pattern showing strong lines at values of $2\theta$ of 13.6, 22.3, and 35.5 under copper $K\alpha$ radiation, at a rate of application of from about 1 to about 3 pounds of the chromate per acre, the chromate being substantially free from copper hydroxide and such as is prepared by incorporating $CrO_3$ into $Cu(OH)_2$ and reacting the $CrO_3$ with the $Cu(OH)_2$ in the said copper to chromium molar ratios, the color of the chromate varying from a yellow brown to a light green to an olive green as the amount of copper reacted with the chromium increases within said limits.

7. Method of preparing a basic copper-chromate pesticide which comprises incorporating $CrO_3$ into $Cu(OH)_2$ in the molar ratio of from about 3.5 to about 6 moles of $Cu(OH)$ to 1 mole of $CrO_3$ and working the mass until no color change of the mass is obtained upon further working and an X-ray pattern of the reacted mass shows strong lines at values of $2\theta$ of 13.6, 22.3, and 35.5 under copper $K\alpha$ radiation.

References Cited in the file of this patent

UNITED STATES PATENTS

| | | |
|---|---|---|
| 1,766,412 | Taylor | June 24, 1930 |
| 2,400,863 | Gelfand | May 21, 1946 |
| 2,438,511 | McMahon | Mar. 30, 1948 |
| 2,573,738 | Smith et al. | Nov. 6, 1951 |
| 2,573,739 | Whaley | Nov. 6, 1951 |

OTHER REFERENCES

Mellor: "Comprehensive Treatise on Inorganic and Theoretical Chemistry," vol. 11, pages 260 to 262, 1931, Longmans, Green and Co., New York city.